(12) United States Patent
Baltas et al.

(10) Patent No.: US 9,017,037 B2
(45) Date of Patent: Apr. 28, 2015

(54) ROTOR WITH FLATTENED EXIT PRESSURE PROFILE

(75) Inventors: Constantine Baltas, Manchester, CT (US); Dilip Prasad, Newbury Park, CA (US); Edward J. Gallagher, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 700 days.

(21) Appl. No.: 13/357,019

(22) Filed: Jan. 24, 2012

(65) Prior Publication Data

US 2013/0189117 A1    Jul. 25, 2013

(51) Int. Cl.
*F01D 5/14* (2006.01)

(52) U.S. Cl.
CPC ............ *F01D 5/141* (2013.01); *F05D 2240/30* (2013.01); *F05D 2240/301* (2013.01); *F05D 2240/304* (2013.01); *Y02T 50/671* (2013.01); *Y02T 50/673* (2013.01)

(58) Field of Classification Search
CPC ...................................................... F01D 5/141
USPC ........... 416/223 R, DIG. 2, 241 R; 415/199.5
See application file for complete search history.

(56) References Cited

U.S. PATENT DOCUMENTS

| | | | |
|---|---|---|---|
| 3,465,524 A | 9/1969 | Light et al. | |
| 3,546,882 A | 12/1970 | Berkey | |
| 4,183,210 A | 1/1980 | Snell | |
| 4,414,807 A | 11/1983 | Kerr | |
| 4,741,667 A | 5/1988 | Price et al. | |
| 5,778,659 A | 7/1998 | Duesler et al. | |
| 5,867,980 A | 2/1999 | Bartos | |
| 6,732,502 B2 | 5/2004 | Seda et al. | |
| 6,901,739 B2 | 6/2005 | Christopherson | |
| 7,204,676 B2 | 4/2007 | Dutton et al. | |
| 7,877,980 B2 | 2/2011 | Johnson | |
| 8,235,658 B2 * | 8/2012 | Guemmer | 415/199.5 |
| 2005/0178105 A1 | 8/2005 | Kawamoto et al. | |
| 2007/0025855 A1 * | 2/2007 | Bouron et al. | 416/216 |
| 2009/0094989 A1 | 4/2009 | Kraft et al. | |
| 2009/0211221 A1 | 8/2009 | Roberge | |
| 2009/0304518 A1 | 12/2009 | Kodama et al. | |
| 2010/0011740 A1 | 1/2010 | McVey | |
| 2010/0218483 A1 | 9/2010 | Smith | |
| 2011/0206527 A1 * | 8/2011 | Harvey et al. | 416/223 R |

OTHER PUBLICATIONS

Schmidt et al., NASA Technical Paper 1294, Aug. 1978.*
Reid et al , NASA Technical Paper 1338, Nov. 1978.*
"The Design of High-Efficiency Turbomachinery and Gas Turbines", David Wilson, The MIT Press, c. 1984, Chapter 5, Section 5.1.
International Search Report and Written Opinion from PCT Application No. PCT/US2013/021178; dated Mar. 12, 2013, 8 pages.

* cited by examiner

*Primary Examiner* — Nathaniel Wiehe
*Assistant Examiner* — Woody A Lee, Jr.
(74) *Attorney, Agent, or Firm* — Kinney & Lange, P.A.

(57) ABSTRACT

A rotor blade comprises an airfoil extending radially from a root section to a tip section and axially from a leading edge to a trailing edge, the leading and trailing edges defining a curvature therebetween. The curvature determines a relative exit angle at a relative span height between the root section and the tip section, based on an incident flow velocity at the leading edge of the airfoil and a rotational velocity at the relative span height. In operation of the rotor blade, the relative exit angle determines a substantially flat exit pressure ratio profile for relative span heights from 75% to 95%, wherein the exit pressure ratio profile is constant within a tolerance of 10% of a maximum value of the exit pressure ratio profile.

23 Claims, 4 Drawing Sheets

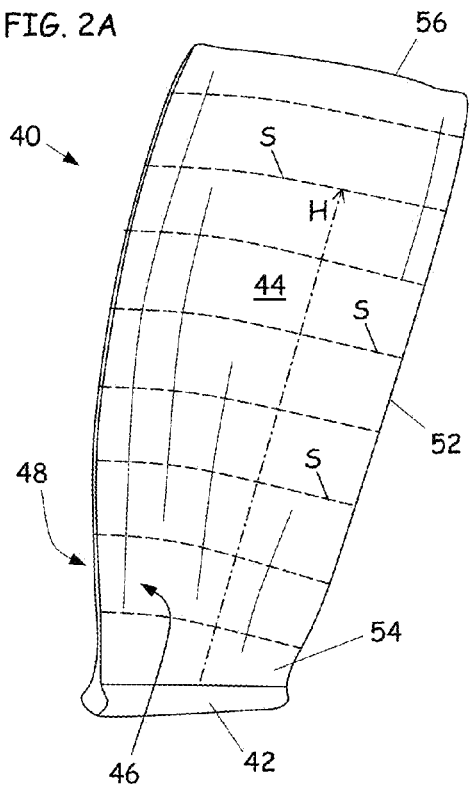
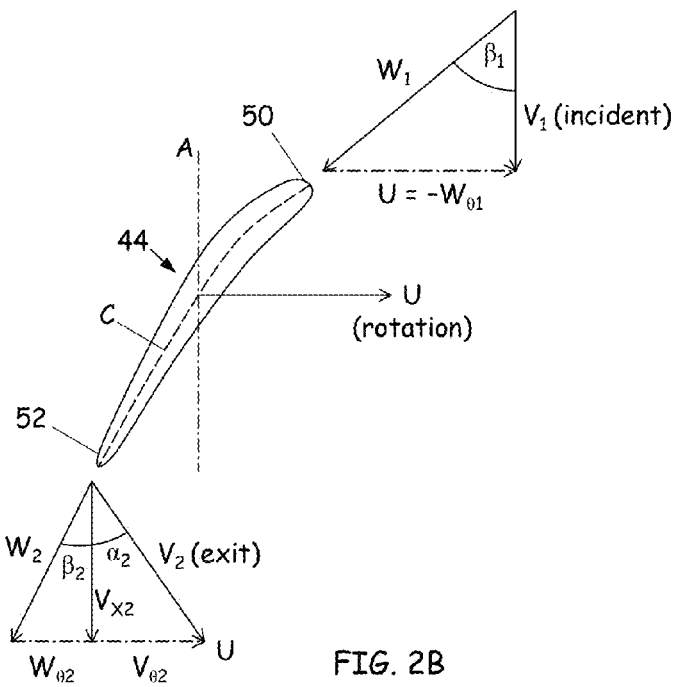
FIG. 2A
FIG. 2B

ROTOR WITH FLATTENED EXIT PRESSURE PROFILE

STATEMENT OF GOVERNMENT INTEREST

This invention was made with government support under contract number NAS3-01138 awarded by NASA. The government has certain rights in the invention.

BACKGROUND

This invention relates generally to turbomachinery, and specifically to turbine rotor components. In particular, the invention concerns a fan or compressor rotor for a gas turbine engine.

Gas turbine engines (or combustion turbines) are built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

Gas turbine engines provide efficient, reliable power for a wide range of applications, including aviation and industrial power generation. Small-scale engines including auxiliary power units typically utilize a one-spool design, with co-rotating compressor and turbine sections. Larger-scale jet engines and industrial gas turbines (IGTs) are generally arranged into a number of coaxially nested spools, which operate at different pressures and temperatures, and rotate at different speeds.

The individual compressor and turbine sections in each spool are subdivided into a number of stages, which are formed of alternating rows of rotor blade and stator vane airfoils. The airfoils are shaped to turn, accelerate and compress the working fluid flow, and to generate lift for conversion to rotational energy in the turbine.

Ground-based industrial gas turbines can be quite large, utilizing complex spooling systems for increased efficiency. Power is delivered via an output shaft connected to an electrical generator, or other mechanical load. Industrial turbines can also be configured for combined-cycle operation, in which additional energy is extracted from the exhaust stream, for example using a low pressure steam turbine.

Aviation applications include turbojet, turbofan, turboprop and turboshaft engines. In turbojet engines, thrust is generated primarily from the exhaust. Modern fixed-wing aircraft generally employ turbofan and turboprop designs, in which the low pressure spool is coupled to a propulsion fan or propeller. Turboshaft engines are typically used on rotary-wing aircraft, including helicopters.

Turbofan engines are commonly divided into high and low bypass configurations. High bypass turbofans generate thrust primarily from the fan, which drives airflow through a bypass duct oriented around the engine core. This design is common on commercial aircraft and military transports, where noise and fuel efficiency are primary concerns.

Low bypass turbofans generate proportionally more thrust from the exhaust flow, providing greater specific thrust for use on supersonic fighters and other high-performance aircraft. Unducted (open rotor) turbofans and ducted propeller configurations are also known, and there are also counter-rotating and aft-mounted designs.

Turbofan engine performance depends on precise control of the working fluid flow, including the pressure profile across each of the compressor and fan stages. Where engine noise and efficiency are factors, they pose competing demands on fan and compressor blade design.

SUMMARY

This invention concerns a rotor blade, a rotor stage formed of a plurality of the rotor blades, and a turbine engine utilizing the rotor stage. The rotor blade has a leading edge, a trailing edge, a root section and a tip section, with an airfoil portion extending radially from the root section to the tip section, and axially from the leading edge to the trailing edge.

The curvature of the airfoil is defined between the leading and trailing edges, and at a relative span height between the root section and the tip section. In operation of the rotor blade, the curvature determines a relative exit angle at the trailing edge, based on the incident flow velocity at the leading edge and the rotational velocity of the blade at the relative span height. The relative exit angle determines a substantially constant exit pressure ratio profile for relative span heights from 75% to 95%, within a tolerance of 10% of the maximum value of the exit pressure ratio profile.

A rotor blade comprises a leading edge, a trailing edge, a root section and a tip section. An airfoil extends radially from the root section to the tip section and axially from the leading edge to the trailing edge. The leading and trailing edges defining a curvature therebetween. In operation of the rotor blade, the curvature determines a relative exit angle at a span height between the root section and the tip section, based on an incident flow velocity at the leading edge of the airfoil and a rotational velocity at the relative span height. In operation of the rotor blade, the relative exit angle determines an exit pressure ratio profile that is substantially constant for relative span heights from 75% to 95%, within a tolerance of 10% of a maximum value of the exit pressure ratio profile.

In additional or alternative embodiments of any of the foregoing embodiments, the exit pressure ratio profile is non-decreasing for relative span heights from 50% to 95%. In additional or alternative embodiments of any of the foregoing embodiments, the tolerance is 2% of the maximum value of the exit pressure ratio profile. In additional or alternative embodiments of any of the foregoing embodiments, the exit pressure ratio profile has an absolute value of at least 1.3 for each of the relative span heights from 75% to 95%.

In additional or alternative embodiments of any of the foregoing embodiments, the relative exit angle is defined according to angle $\beta_2$ or angle $\beta_2'$ as set forth in Table 1 herein for relative span heights from 75% to 95%, within a tolerance of two degrees (±2°). In additional or alternative embodiments of any of the foregoing embodiments, the relative exit angle is defined according to angle $\beta_2$ or angle $\beta_2'$ as provided in Table 1 herein, for relative span heights from 5% to 95% and within a tolerance of one degree (±1°).

In additional or alternative embodiments of any of the foregoing embodiments, a gas turbine engine comprises the rotor blade. In additional or alternative embodiments of any of the foregoing embodiments, a rotor stage comprises a plurality of circumferentially arranged rotor blades, wherein in operation of the rotor stage the exit pressure ratio profile has an absolute value of at least 1.3 for each of the relative span heights from 75% to 95%.

In additional or alternative embodiments of any of the foregoing embodiments, a gas turbine engine comprises the rotor stage, wherein in operation of the gas turbine engine the exit pressure ratio profile has an absolute value of at least 1.4 for each of the relative span heights from 75% to 95%. In additional or alternative embodiments of any of the foregoing embodiments, the exit pressure ratio profile has an absolute value of at least 1.4 for relative span heights between 95% and 98%.

A rotor comprises a rotor hub and a plurality of airfoils rotationally coupled to the rotor hub, each airfoil extending axially from a leading edge to a trailing edge and radially from a root section proximate the rotor hub to a tip section opposite the rotor hub, the leading edge and the trailing edge defining a curvature therebetween. In operation of the rotor, the curvature determines a relative exit angle at a relative span height between the root section and the tip section, based on an incident flow velocity at the leading edge of the airfoil and a rotational velocity of the airfoil at the relative span height. In operation of the rotor, the relative exit angle determines a substantially uniform exit pressure ratio for span heights from 75% to 95%, within a tolerance of 10% of a maximum of the exit pressure ratio.

In additional or alternative embodiments of any of the foregoing embodiments, the tolerance is 2% of the maximum of the exit pressure ratio. In additional or alternative embodiments of any of the foregoing embodiments, the exit pressure ratio is non-decreasing for relative span heights from 50% to 95%. In additional or alternative embodiments of any of the foregoing embodiments, the relative exit angle is defined according to angle $\beta_2$ or angle $\beta_2'$ as provided in Table 1 herein for relative span heights from 25% to 95%, within a tolerance of one degree ($\pm 1°$).

In additional or alternative embodiments of any of the foregoing embodiments, a fan stage comprises the rotor, wherein the exit pressure ratio has an absolute value of at least 1.3 for each of the relative span heights from 75% to 95%. In additional or alternative embodiments of any of the foregoing embodiments, a turbofan engine comprises the fan stage, wherein the exit pressure has an absolute value of at least 1.4 for each of the relative span heights from 75% to 95%. In additional or alternative embodiments of any of the foregoing embodiments, the exit pressure ratio has an absolute value of at least 1.4 for relative span heights between 95% and 98%.

A fan blade comprises an airfoil extending radially from a root section to a tip section, the airfoil having a leading edge and a trailing edge defining a curvature at a relative span height between the root section and the tip section. In operation of the fan blade, the curvature determines a relative exit angle at the trailing edge, based on an incident flow velocity at the leading edge and a rotational velocity of the airfoil at the relative span height. The relative air angle is defined according to angle $\beta_2$ or angle $\beta_2'$ as provided in Table 1 herein for relative span heights between 75% and 95%, within a tolerance of two degrees ($\pm 2°$).

In additional or alternative embodiments of any of the foregoing embodiments, the relative air angle is defined according to angle $\beta_2$ or angle $\beta_2'$ as provided in Table 1 herein for relative span heights between 25% and 95%, within a tolerance of one degree ($\pm 1°$). In additional or alternative embodiments of any of the foregoing embodiments, in operation of the fan blade the relative air angle determines a substantially flat exit pressure ratio profile for relative span heights from 75% to 95%, wherein the exit pressure ratio profile is substantially constant within a tolerance of 10% of a maximum value of the exit pressure ratio profile.

In additional or alternative embodiments of any of the foregoing embodiments, the tolerance is 2% of the maximum value of the exit pressure ratio profile. In additional or alternative embodiments of any of the foregoing embodiments, the exit pressure ratio profile is non-decreasing for relative span heights from 50% to 95%.

In additional or alternative embodiments of any of the foregoing embodiments a turbofan engine comprises the fan blade. In additional or alternative embodiments of any of the foregoing embodiments, a turbine engine comprise the fan blade, wherein in operation of the turbine engine the relative air angle determines an exit pressure ratio that has an absolute value of at least 1.3 for each of the relative span heights from 75% to 95%. In additional or alternative embodiments of any of the foregoing embodiments, the exit pressure ratio has an absolute value of at least 1.4 at a relative span height of 97%.

BRIEF DESCRIPTION OF THE DRAWINGS

FIG. 2A is a perspective view of a rotor blade having a flattened exit pressure profile.

FIG. 2B is a cross sectional view of the rotor blade, illustrating leading edge and trailing edge velocity triangles.

DETAILED DESCRIPTION

Figure 1:
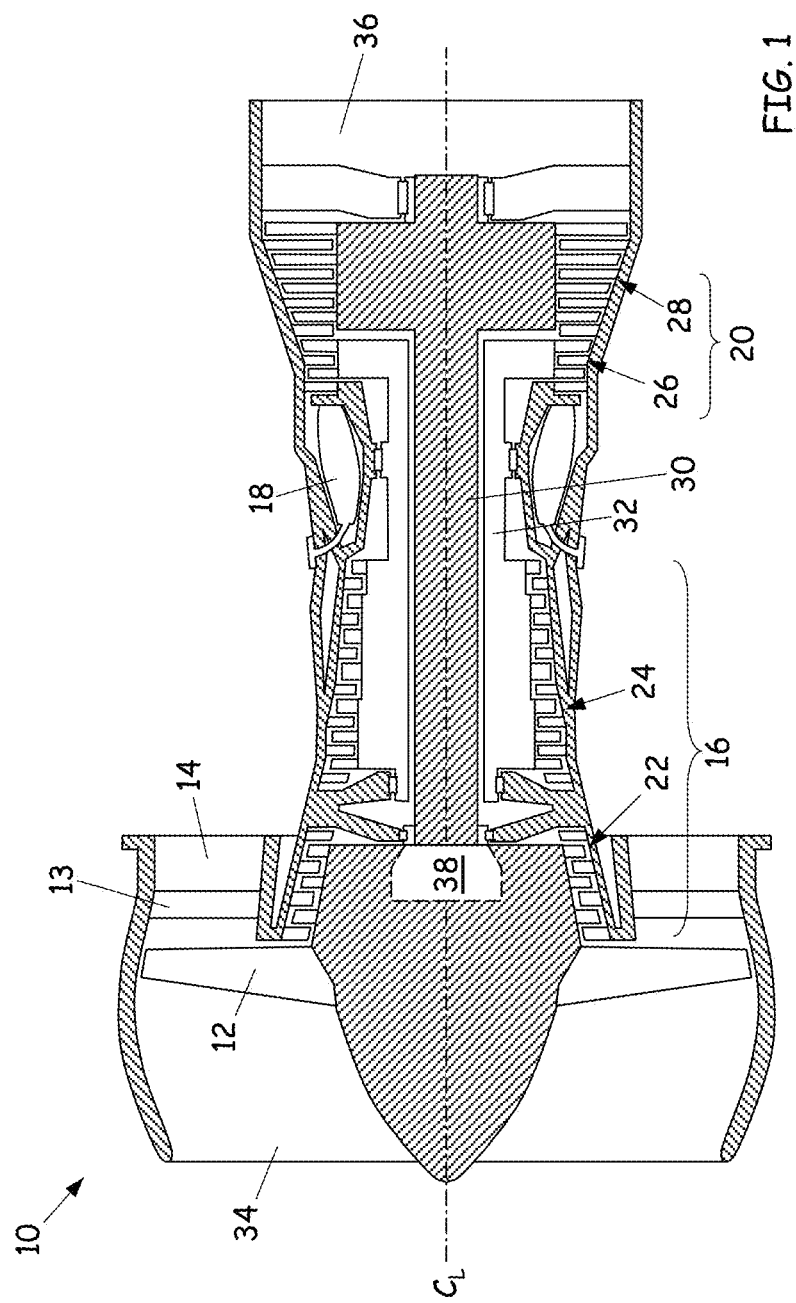
FIG. 1 is a cross-sectional view of a gas turbine engine having a fan rotor with a flattened exit pressure profile.

FIG. 1 is a cross-sectional view of gas turbine engine 10, in a turbofan configuration. In this configuration, gas turbine engine 10 includes propulsion fan 12 with fan exit guide vanes (FEGVs) 13 mounted inside bypass duct 14. The power core includes compressor section 16, combustor 18 and turbine section 20.

Propulsion fan 12 has a flattened exit pressure profile to decrease wake interactions with fan exit guide vanes 13, reducing the noise profile of gas turbine engine 10 and improving engine performance by better managing downstream vorticity in bypass duct 14. The flattened exit pressure profile is defined in terms of the pressure ratio across fan rotor 12, using an aerodynamic blade geometry based on airfoil curvature and relative exit (air) angle to define the stagnation pressure ratio or total pressure head across fan rotor 12, as described below.

In the two-spool, high bypass configuration of FIG. 1, compressor section 16 includes low pressure compressor (LPC) 22 and high pressure compressor (HPC) 24. Turbine section 20 comprises high pressure turbine (HPT) 26 and low pressure turbine (LPT) 28.

Low pressure compressor 22 is rotationally coupled to low pressure turbine 28 via low pressure (LP) shaft 30, forming the LP spool or low spool. High pressure compressor 24 is rotationally coupled to high pressure turbine 26 via high pressure (HP) shaft 32, forming the HP spool or high spool.

In operation of gas turbine engine 10, fan 12 accelerates air flow from inlet 34 through bypass duct 14, generating thrust. The core airflow is compressed in low pressure compressor 22 and high pressure compressor 24, then mixed with fuel in combustor 18 and ignited to generate combustion gas.

The combustion gas expands to drive high and low pressure turbines 26 and 28, which are rotationally coupled to high pressure compressor 24 and low pressure compressor 22, respectively. Expanded combustion gases exit through exhaust nozzle 36, which is shaped to generate additional thrust from the exhaust gas flow.

In advanced turbofan designs, low pressure shaft 30 is coupled to fan 12 via geared drive mechanism 38, providing improved fan speed control for increased efficiency and reduced engine noise. Propulsion fan 12 may also function as a first-stage compressor for gas turbine engine 10, with low pressure compressor 22 performing as an intermediate-stage compressor or booster. Alternatively, the low pressure compressor stages are absent, and air from fan 12 is provided directly to high pressure compressor 24, or to an independently rotating intermediate compressor spool.

Gas turbine engine 10 thus encompasses a range of different shaft and spool geometries, including one-spool, two-spool and three-spool configurations, in both co-rotating and counter-rotating designs. Gas turbine engine 10 may also be configured as a low bypass turbofan, an open-rotor turbofan, a ducted or unducted propeller engine, or an industrial gas turbine.

Fan and compressor noise contributions have both tonal and broadband components, each with significance for gas turbine engine design. When the fan or compressor rotor is modified to flatten the exit pressure ratio, wake interactions are decreased and the overall noise output is reduced. The size of the corresponding rotor stages can also reduced, as compared to larger designs that would otherwise be required to lower the noise signature. The flattened fan exit pressure ratio profile of gas turbine engine 10 may thus provide improved fuel efficiency with less noise, while reducing engine size and weight.

A substantial component of engine noise is generated by fan 12, particularly where the fan blade wakes interact with fan exit guide vanes 13. Noise during the takeoff and landing phases of flight has thus become a major driver in the design of gas turbine engines for aviation. In ultra high bypass ratio turbofans, for example, other jet noise sources may be substantially reduced, making fan noise appear more pronounced, as a relative contribution to the total noise output.

There are similar blade/vane interactions in compressor (or impeller) section 16, and aero-derivative turbine components and design techniques are also used in other industries. Thus, the flattened fan pressure ratio profiles described here have broad utility in both fan and compressor rotor design for aviation and ground-based turbine engines, including, but not limited to, turbofan engines, turboprop engines and industrial gas turbines.

FIG. 2A is a perspective view of rotor blade 40 for the fan or compressor stage of a gas turbine engine. In this particular configuration, rotor blade 40 includes dovetail mount 42 and airfoil portion 44, with pressure surface 46 (front side) and suction surface 48 (back side) extending axially from leading edge 50 to trailing edge 52. Airfoil sections S (dashed lines) are defined at relative span heights H, where span heights H extend radially from hub or root section 54, at 0% relative span, to airfoil tip section 56, at 100% relative span.

Rotor/vane interaction noise stems from turbulent wake flows generated by upstream rotor stages, which induce unsteady pressure gradients when they impinge on downstream vanes. The wake-induced pressure patterns do not have to be circumferentially or radially non-uniform to radiate noise, but the mean unsteady flow is circumferentially non-uniform, resulting in increased noise. To address this problem, airfoil sections S are designed with aerodynamic curvature to flatten the exit pressure ratio profile of rotor blade 40, reducing noise contributions while maintaining rotor efficiency.

FIG. 2B is a cross-sectional view of rotor airfoil 44, illustrating velocity triangles at leading and trailing edges 50 and 52, respectively. In operation, airfoil 44 has circumferential rotational velocity U, perpendicular to engine axis A, and as defined at a particular span height H (see FIG. 2A).

Flow on leading edge 50 of airfoil 44 is incident at "absolute" velocity $V_1$, measured in the engine frame. Incident velocity $V_1$ may be substantially axial, or include axial, radial and circumferential components. In flight applications, the axial component of incident velocity $V_1$ may include airspeed, for example where airspeed results in an axial flow component onto the fan or compressor section of a turbofan or turboprop engine.

Relative incident velocity $W_1$ is measured in the frame of airfoil 44 (the rotor frame), making angle $\beta_1$ with respect to incident velocity $V_1$, as measured in the engine frame. Relative incident velocity $W_1$ has component $W_{\theta 1}=-U$ along the rotational (circumferential) direction.

Flow exits trailing edge 52 of airfoil 44 at relative exit velocity $W_2$, measured in the rotor fame. Relative exit velocity $W_2$ makes angle $\beta_2$ with respect to axial component $V_{x2}$ of exit velocity $V_2$, and has circumferential component $W_{\theta 2}$. "Absolute" exit velocity $V_2$ is measured in the engine frame, making angle $\alpha_2$ with respect to axial component $V_{x2}$, with circumferential component $V_{\theta 2}$ (or $C_{\theta 2}$) along the direction of rotation.

Relative air angle (or relative exit angle) $\beta_2$ is defined in the rotor frame, between relative exit flow velocity $W_2$ and the axial direction at trailing edge 52 of airfoil 44. Alternatively, complementary relative angle $\beta_2'$ is used, where $\beta_2'=90°-\beta_2$.

Any of angles $\alpha_1$, $\beta_1$ and $\beta_2$ may also be defined using other conventions, either complementary or otherwise. In addition, any differences $\Delta$ in angle may be defined with either a positive or negative sense, depending on the selected convention for angles $\alpha_1$, $\beta_1$, and $\beta_2$.

Figure 3A:
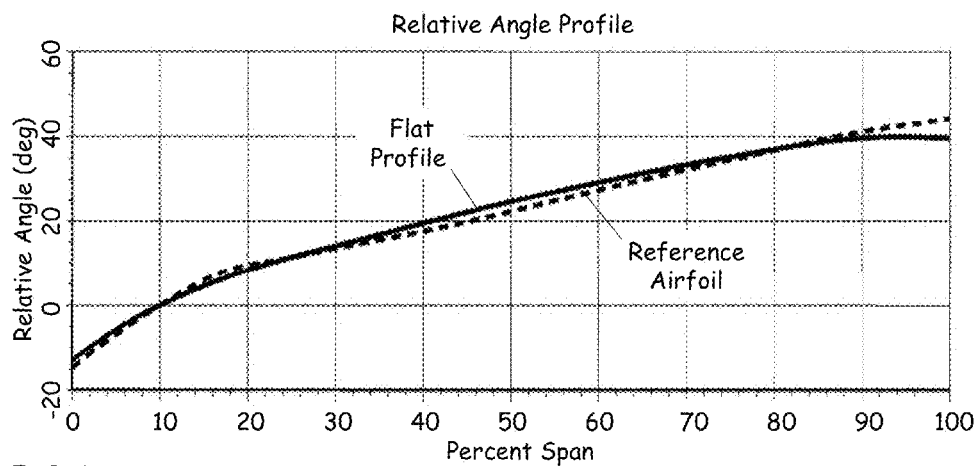
FIG. 3A is a relative air angle profile for the rotor blade.

FIG. 3A is a plot of relative angle $\beta_2$ for a rotor airfoil (or blade) with a flattened exit pressure profile (solid line), as compared to a reference rotor airfoil (dashed line). The relative (exit) angle is given on the vertical axis (in degrees), as a function of relative span height along the horizontal (in percent).

Figure 3B:
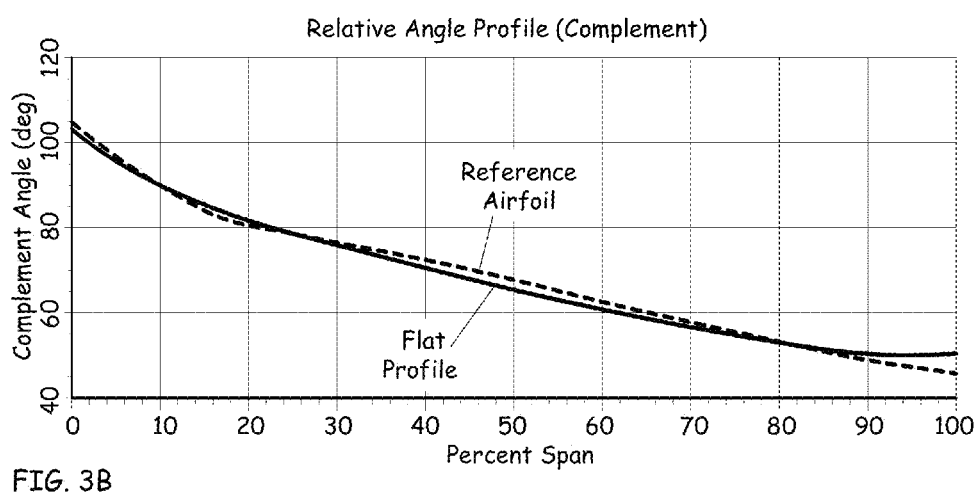
FIG. 3B is a relative air angle profile for the rotor blade, using an alternate angular definition.

FIG. 3B a plot of complementary air angle $\beta_2'=90°-\beta_2$, for a rotor airfoil with a flattened exit pressure profile (solid line), as compared to a reference rotor airfoil (dashed line). The complementary (exit) angle is given on the vertical axis (in degrees), as a function of relative span height along the horizontal (in percent).

Figure 4:
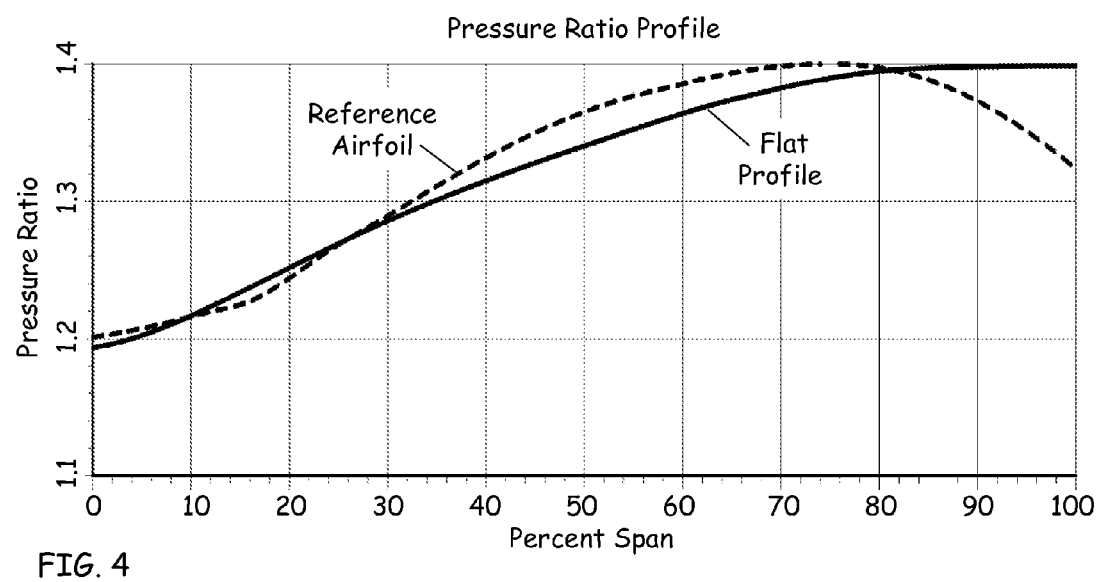
FIG. 4 is a stagnation pressure ratio profile for the rotor blade.

FIG. 4 is a plot of the downstream (exit) pressure profile (stagnation pressure ratio) for a rotor airfoil with a flattened pressure profile (solid line), as compared to a reference rotor blade (dashed line). The exit pressure profile is given in terms of the pressure ratio across the rotor blade (vertical axis, in normalized, dimensionless units), as a function of relative span height (horizontal axis, in percent). The corresponding relative (exit) angles and pressure ratio (PR) values are provided in Table 1.

The dashed line in FIG. 4 represents the reference airfoil of FIG. 3A or 3B. The reference exit pressure ratio has a peak at approximately 75% span, dropping off substantially (by more than 10%) between 75% and 90% span, even more substantially (by more than 30%) toward 100% span (see Table 1). As seen by the downstream vanes, these pressure patterns cause a non-uniform velocity distribution along the corresponding span of the stator stage, resulting in an increased angle of attack, greater turbulent losses, and more noise production.

The solid line in FIG. 4 shows that aerodynamic blade curvature can define a relative exit angle profile with a flatter exit pressure profile. In one particular design, the exit pressure ratio also increases monotonically across the full span of the blade, including the outer 50-100% span, remaining substantially flat across 75-100% span, within a tolerance of ±0.010.

This results in a more uniform pressure and velocity profile across the span of the blade, reducing downstream turbulent losses and noise. Alternatively, the pressure profile may decrease slightly at 90-100% span, for example by less than 5% or less than 10% (normalized), or by less than 0.10 or less than 0.15 in the scaled (absolute) pressure ratio values, in order to further improve performance.

The angular values in Table 1 have a nominal point-to-point tolerance of a tenth of a degree (±0.1°), with an absolute tolerance ranging up to one degree (±1°) or two degrees (±2°), depending on application and the corresponding tolerance in the selected pressure ratio. Alternatively, the angular tolerance is one-half degree (±0.5°)

Both normalized and absolute pressure ratio values are provided in Table 1, with a nominal point-to-point tolerance of ±0.002. The absolute tolerance ranges from ±0.05, ±0.10, and ±0.15 to ±0.20 or more, depending on application and the corresponding tolerance in the selected air angle.

The normalized pressure ratios in Table 1 can be scaled to a one-dimensional average of the values or based on a particular span location, for example midspan. The absolute values are scaled to yield particular physical values of the actual pressure ratio, as measured across a rotating blade, for example using a scale factor of S=1.35±0.05. Other scale factors S range from about S=0.8 to about S=1.6, for example S=0.8, S=0.9, S=1.0, S=1.1, S=1.2, S=1.3, S=1.4, S=1.5, or S=1.6.

Relative angles $\beta_2$ (or $\beta_2'$) of airfoil 44 are selected to achieve a uniform downstream pressure pattern, with a flat exit pressure profile as compared to the reference blade. The exit pressure profile is defined by the physical blade geometry, and does not depend on the convention used to measure the relative air (or exit) angles, or other angular convention.

In particular, the flat exit pressure profile of FIG. 4 is determined by the aerodynamic design of airfoil 44, as shown in FIGS. 2A and 2B. The aerodynamic design of airfoil 44, in turn, is determined by the curvature of camber lines C as defined along span height H, including the corresponding chord length, flow area and relative air angles $\beta_2$ (or $\beta_2'$).

Thus, the geometry of airfoil 44 may be defined by the relative angle profile, as given in Table 1 for various span heights between 0% and 100%. Alternatively, the relative angle profile may be defined as a difference (Δ) with respect to a reference airfoil, or in terms of complementary angle $\beta_2'$.

Table 1 and FIGS. 3A and 3B provide particular examples of relative exit angles that determine the flat pressure profile of FIG. 4, but other relative angle profiles may be used. The relative angles also vary within the stated tolerances, and utilize different angular conventions. In addition, the pressure ratio profile depends upon blade height and rotational velocity, as described below.

Conversely, the aerodynamic design of airfoil 44 may be determined by the pressure ratio profiles of FIG. 4, and the corresponding PR values in Table 1. In particular, the pressure ratio determines the relative exit angle profile ($\beta_2$ or $\beta_2'$) for a given span height and rotational velocity, based on the curvature of camber lines C. Note, however, that pressure ratios PR also vary within the stated tolerances, and may be described in either normalized or absolute (scaled) terms.

Thus, the geometry of airfoil 44 may be defined either in terms of the relative exit angle or the pressure ratio profile, as a function of the relative span height between 0% (root section) and 100% span (tip section), for a given range of blade height and rotational speeds. Due to endwall effects, however, the span range may be modified or limited to regions of well defined pressure ratios PR. Alternatively, the span range is defined over particular portions of the for example the blade tip or midspan regions.

Thus, the lower end of the span range may be defined from substantially 0% span, or as a range extending from or above about 1% span, about 2% span, or about 5% span. Similarly, the higher end of the span range may be defined up to substantially 100% span, or as a range extending up to or below about 95% span, 98% span or 99% span.

The midspan range may be defined at approximately 50% span, or from about 25% to about 75% span. Other span ranges are also contemplated, including any combination of particular relative span values provided in Table 1, along with the corresponding pressure ratios and relative angles $\beta_2$ and $\beta_2'$.

The flat pressure ratio profile design techniques described here are applicable to blades operated at subsonic, transonic and supersonic speeds. Representative blade outer diameters range from 50-100 inches (127-254 cm), or 25-50 inches (63-127 cm) in height measured from the engine axis at full span. For shorter blades, representative diameters range from about 30-50 inches (76-127 cm), or 15-25 inches (38-64 cm) in height from the engine axis. For longer blades, representative diameters range up to 100-140 inches (254-356 cm), or 50-70 inches (127-175 cm) in height from the engine axis. Representative rotational speeds range from 2,000-6,000 RPM, extending down to 1,000-3,000 RPM for longer blades and up to 5,000-10,000 RPM for shorter blades.

While this invention has been described with reference to exemplary embodiments, it will be understood by those skilled in the art that various changes may be made and equivalents may be substituted for elements thereof without departing from the spirit and scope of the invention. In addition, modifications may be made to adapt a particular situation or material to the teachings of the invention, without departing from the essential scope thereof. Therefore, the invention is not limited to the particular embodiments disclosed herein, but includes all embodiments falling within the scope of the appended claims.

TABLE 1

Pressure Ratio and Relative Angle Profiles

| Span | Pressure Ratio | | Relative Angle | | | Comp. |
| | | | $\beta_2$ | ref. | Δ | $\beta_2'$ |
| (%) | Normal | Scaled | (deg) | (deg) | (deg) | (90° − $\beta_2$) |
|---|---|---|---|---|---|---|
| 0 | 0.886 | 1.192 | −13.5 | −15.2 | 1.7 | 103.5 |
| 1 | 0.887 | 1.194 | −12.0 | −13.7 | 1.7 | 102.0 |
| 2 | 0.888 | 1.196 | −9.5 | −11.1 | 1.6 | 99.5 |
| 3 | 0.889 | 1.198 | −8.5 | −10.0 | 1.5 | 98.5 |
| 4 | 0.891 | 1.200 | −7.0 | −8.3 | 1.3 | 97.0 |
| 5 | 0.892 | 1.202 | −5.5 | −6.6 | 1.1 | 95.5 |
| 6 | 0.894 | 1.204 | −4.5 | −5.4 | 0.9 | 94.5 |
| 7 | 0.896 | 1.207 | −3.5 | −4.2 | 0.7 | 93.5 |
| 8 | 0.898 | 1.210 | −2.0 | −2.5 | 0.5 | 92.0 |
| 9 | 0.901 | 1.213 | −1.0 | −1.2 | 0.2 | 91.0 |
| 10 | 0.903 | 1.217 | 0.0 | 0.0 | 0.0 | 90.0 |
| 11 | 0.906 | 1.220 | 1.0 | 1.3 | −0.3 | 89.0 |
| 12 | 0.908 | 1.223 | 2.0 | 2.6 | −0.6 | 88.0 |
| 13 | 0.911 | 1.227 | 2.5 | 3.4 | −0.9 | 87.5 |
| 14 | 0.913 | 1.230 | 3.5 | 4.7 | −1.2 | 86.5 |
| 15 | 0.916 | 1.234 | 4.5 | 5.9 | −1.4 | 85.5 |
| 16 | 0.918 | 1.237 | 5.0 | 6.5 | −1.5 | 85.0 |
| 17 | 0.921 | 1.241 | 6.0 | 7.6 | −1.6 | 84.0 |
| 18 | 0.924 | 1.245 | 7.0 | 8.5 | −1.5 | 83.0 |
| 19 | 0.926 | 1.248 | 7.5 | 8.8 | −1.3 | 82.5 |
| 20 | 0.929 | 1.252 | 8.0 | 9.1 | −1.1 | 82.0 |

TABLE 1-continued

Pressure Ratio and Relative Angle Profiles

| Span (%) | Pressure Ratio Normal | Pressure Ratio Scaled | Relative Angle β₂ (deg) | Relative Angle ref. (deg) | Relative Angle Δ (deg) | Comp. β₂' (90° − β₂) |
|---|---|---|---|---|---|---|
| 21 | 0.932 | 1.255 | 8.5 | 9.4 | −0.9 | 81.5 |
| 22 | 0.934 | 1.259 | 9.5 | 10.1 | −0.6 | 80.5 |
| 23 | 0.937 | 1.262 | 10.0 | 10.4 | −0.4 | 80.0 |
| 24 | 0.940 | 1.266 | 11.0 | 11.2 | −0.2 | 79.0 |
| 25 | 0.942 | 1.269 | 11.5 | 11.5 | 0.0 | 78.5 |
| 26 | 0.945 | 1.273 | 12.0 | 11.9 | 0.1 | 78.0 |
| 27 | 0.947 | 1.277 | 12.5 | 12.3 | 0.2 | 77.5 |
| 28 | 0.950 | 1.280 | 13.0 | 12.7 | 0.3 | 77.0 |
| 29 | 0.952 | 1.283 | 13.5 | 13.1 | 0.4 | 76.5 |
| 30 | 0.954 | 1.286 | 14.0 | 13.4 | 0.6 | 76.0 |
| 31 | 0.957 | 1.289 | 14.5 | 13.8 | 0.7 | 75.5 |
| 32 | 0.959 | 1.292 | 15.0 | 14.2 | 0.8 | 75.0 |
| 33 | 0.961 | 1.295 | 15.5 | 14.5 | 1.0 | 74.5 |
| 34 | 0.964 | 1.298 | 16.0 | 14.9 | 1.1 | 74.0 |
| 35 | 0.966 | 1.301 | 16.5 | 15.2 | 1.3 | 73.5 |
| 36 | 0.968 | 1.304 | 17.5 | 16.1 | 1.4 | 72.5 |
| 37 | 0.970 | 1.307 | 18.0 | 16.5 | 1.5 | 72.0 |
| 38 | 0.972 | 1.310 | 18.5 | 16.8 | 1.7 | 71.5 |
| 39 | 0.974 | 1.313 | 19.0 | 17.2 | 1.8 | 71.0 |
| 40 | 0.976 | 1.315 | 19.5 | 17.6 | 1.9 | 70.5 |
| 41 | 0.978 | 1.317 | 20.0 | 18.0 | 2.0 | 70.0 |
| 42 | 0.980 | 1.320 | 20.5 | 18.4 | 2.1 | 69.5 |
| 43 | 0.982 | 1.323 | 21.0 | 18.9 | 2.1 | 69.0 |
| 44 | 0.984 | 1.326 | 21.5 | 19.3 | 2.2 | 68.5 |
| 45 | 0.986 | 1.328 | 22.0 | 19.7 | 2.3 | 68.0 |
| 46 | 0.988 | 1.331 | 22.5 | 20.2 | 2.3 | 67.5 |
| 47 | 0.990 | 1.334 | 23.0 | 20.7 | 2.3 | 67.0 |
| 48 | 0.991 | 1.336 | 23.5 | 21.1 | 2.4 | 66.5 |
| 49 | 0.993 | 1.338 | 24.0 | 21.6 | 2.4 | 66.0 |
| 50 | 0.995 | 1.340 | 24.5 | 22.1 | 2.4 | 65.5 |
| 51 | 0.997 | 1.342 | 25.0 | 22.6 | 2.4 | 65.0 |
| 52 | 0.999 | 1.345 | 25.5 | 23.2 | 2.3 | 64.5 |
| 53 | 1.001 | 1.347 | 26.0 | 23.7 | 2.3 | 64.0 |
| 54 | 1.002 | 1.350 | 26.5 | 24.3 | 2.2 | 63.5 |
| 55 | 1.004 | 1.352 | 27.0 | 24.8 | 2.2 | 63.0 |
| 56 | 1.006 | 1.355 | 27.5 | 25.4 | 2.1 | 62.5 |
| 57 | 1.008 | 1.357 | 28.0 | 26.0 | 2.0 | 62.0 |
| 58 | 1.009 | 1.359 | 28.0 | 26.1 | 1.9 | 62.0 |
| 59 | 1.011 | 1.362 | 28.5 | 26.6 | 1.9 | 61.5 |
| 60 | 1.013 | 1.364 | 29.0 | 27.2 | 1.8 | 61.0 |
| 61 | 1.014 | 1.366 | 29.5 | 27.8 | 1.7 | 60.5 |
| 62 | 1.016 | 1.368 | 30.0 | 28.3 | 1.7 | 60.0 |
| 63 | 1.017 | 1.370 | 30.5 | 28.9 | 1.6 | 59.5 |
| 64 | 1.019 | 1.372 | 31.0 | 29.4 | 1.6 | 59.0 |
| 65 | 1.020 | 1.374 | 31.5 | 30.0 | 1.5 | 58.5 |
| 66 | 1.021 | 1.376 | 32.0 | 30.5 | 1.5 | 58.0 |
| 67 | 1.023 | 1.378 | 32.0 | 30.6 | 1.4 | 58.0 |
| 68 | 1.024 | 1.380 | 32.5 | 31.2 | 1.3 | 57.5 |
| 69 | 1.025 | 1.382 | 33.0 | 31.7 | 1.3 | 57.0 |
| 70 | 1.026 | 1.383 | 33.5 | 32.3 | 1.2 | 56.5 |
| 71 | 1.028 | 1.385 | 33.5 | 32.4 | 1.1 | 56.5 |
| 72 | 1.029 | 1.385 | 34.0 | 33.0 | 1.0 | 56.0 |
| 73 | 1.030 | 1.386 | 34.5 | 33.6 | 0.9 | 55.5 |
| 74 | 1.031 | 1.387 | 34.5 | 33.7 | 0.8 | 55.5 |
| 75 | 1.032 | 1.389 | 35.0 | 34.2 | 0.8 | 55.0 |
| 76 | 1.033 | 1.390 | 35.5 | 34.8 | 0.7 | 54.5 |
| 77 | 1.034 | 1.391 | 36.0 | 35.4 | 0.6 | 54.0 |
| 78 | 1.035 | 1.392 | 36.0 | 35.5 | 0.5 | 54.0 |
| 79 | 1.036 | 1.393 | 36.5 | 36.1 | 0.4 | 53.5 |
| 80 | 1.036 | 1.394 | 37.0 | 36.7 | 0.3 | 53.0 |
| 81 | 1.036 | 1.395 | 37.5 | 37.4 | 0.1 | 52.5 |
| 82 | 1.037 | 1.396 | 37.5 | 37.5 | 0.0 | 52.5 |
| 83 | 1.037 | 1.396 | 38.0 | 38.1 | −0.1 | 52.0 |
| 84 | 1.037 | 1.397 | 38.0 | 38.3 | −0.3 | 52.0 |
| 85 | 1.037 | 1.397 | 38.5 | 38.9 | −0.4 | 51.5 |
| 86 | 1.038 | 1.397 | 38.5 | 39.1 | −0.6 | 51.5 |
| 87 | 1.038 | 1.398 | 39.0 | 39.8 | −0.8 | 51.0 |
| 88 | 1.038 | 1.399 | 39.0 | 40.0 | −1.0 | 51.0 |
| 89 | 1.038 | 1.399 | 39.5 | 40.7 | −1.2 | 50.5 |
| 90 | 1.038 | 1.399 | 39.5 | 40.9 | −1.4 | 50.5 |
| 91 | 1.038 | 1.399 | 39.5 | 41.1 | −1.6 | 50.5 |
| 92 | 1.038 | 1.399 | 39.5 | 41.4 | −1.9 | 50.5 |
| 93 | 1.038 | 1.399 | 40.0 | 42.1 | −2.1 | 50.0 |
| 94 | 1.038 | 1.399 | 40.0 | 42.4 | −2.4 | 50.0 |
| 95 | 1.038 | 1.400 | 40.0 | 42.7 | −2.7 | 50.0 |
| 96 | 1.038 | 1.400 | 40.0 | 43.1 | −3.1 | 50.0 |
| 97 | 1.038 | 1.400 | 40.0 | 43.4 | −3.4 | 50.0 |
| 98 | 1.038 | 1.400 | 40.0 | 43.8 | −3.8 | 50.0 |
| 99 | 1.038 | 1.400 | 39.5 | 43.7 | −4.2 | 50.5 |
| 100 | 1.038 | 1.400 | 39.5 | 44.2 | −4.7 | 50.5 |

The invention claimed is:

1. A rotor blade comprising:
a leading edge, a trailing edge, a root section and a tip section; and
an airfoil extending radially from the root section to the tip section and axially from the leading edge to the trailing edge, the leading and trailing edges defining a curvature therebetween;
wherein, in operation of the rotor blade, the curvature determines a relative exit angle at a span height between the root section and the tip section, based on an incident flow velocity at the leading edge of the airfoil and a rotational velocity at the relative span height;
wherein, in operation of the rotor blade, the relative exit angle determines an exit pressure ratio profile that is substantially constant for relative span heights from 75% to 95%, within a tolerance of 10% (±10%) of a maximum value of the exit pressure ratio profile; and
wherein the relative exit angle is defined according to angle $\beta_2$ or angle $\beta_2'$ as set forth in Table 1 herein for relative span heights from 75% to 95%, within a tolerance of two degrees (±2°).

2. The rotor blade of claim 1, wherein the exit pressure ratio profile is non-decreasing for relative span heights from 50% to 95%.

3. The rotor blade of claim 1, wherein the tolerance is 2% (±2%) of the maximum value of the exit pressure ratio profile.

4. The rotor blade of claim 1, wherein the exit pressure ratio profile has an absolute value of at least 1.3 for each of the relative span heights from 75% to 95%.

5. The rotor blade of claim 1, wherein the relative exit angle is defined according to angle $\beta_2$ or angle $\beta_2'$ as provided in Table 1 herein, for relative span heights from 5% to 95% and within a tolerance of one degree (±1°).

6. A gas turbine engine comprising the rotor blade of claim 1.

7. A rotor stage comprising a plurality of circumferentially arranged rotor blades as set forth in claim 1, wherein in operation of the rotor stage the exit pressure ratio profile has an absolute value of at least 1.3 for each of the relative span heights from 75% to 95%.

8. A gas turbine engine comprising the rotor stage of claim 7, wherein in operation of the gas turbine engine the exit pressure ratio profile has an absolute value of at least 1.4 for each of the relative span heights from 75% to 95%.

9. The gas turbine engine of claim 8, wherein the exit pressure ratio profile has an absolute value of at least 1.4 for relative span heights between 95% and 98%.

10. A rotor comprising:
a rotor hub; and
a plurality of airfoils rotationally coupled to the rotor hub, each airfoil extending axially from a leading edge to a trailing edge and radially from a root section proximate the rotor hub to a tip section opposite the rotor hub, the leading edge and the trailing edge defining a curvature therebetween;
wherein, in operation of the rotor, the curvature determines a relative exit angle at a relative span height between the root section and the tip section, based on an incident flow velocity at the leading edge of the airfoil and a rotational velocity of the airfoil at the relative span height; and
wherein, in operation of the rotor, the relative exit angle determines a substantially uniform exit pressure ratio for span heights from 75% to 95%, within a tolerance of 10% (±10%) of a maximum of the exit pressure ratio; and
wherein the relative exit angle is defined according to angle $\beta_2$ or angle $\beta_2'$ as provided in Table 1 herein for relative span heights from 25% to 95%, within a tolerance of one degree (±1°).

11. The rotor of claim 10, wherein the tolerance is 2% (±2%) of the maximum of the exit pressure ratio.

12. The rotor of claim 11, wherein the exit pressure ratio is non-decreasing for relative span heights from 50% to 95%.

13. A fan stage comprising the rotor of claim 10, wherein the exit pressure ratio has an absolute value of at least 1.3 for each of the relative span heights from 75% to 95%.

14. A turbofan engine comprising the fan stage of claim 13, wherein the exit pressure has an absolute value of at least 1.4 for each of the relative span heights from 75% to 95%.

15. The turbofan engine of claim 14, wherein the exit pressure ratio has an absolute value of at least 1.4 for relative span heights between 95% and 98%.

16. A fan blade comprising:
an airfoil extending radially from a root section to a tip section, the airfoil having a leading edge and a trailing edge defining a curvature at a relative span height between the root section and the tip section;
wherein, in operation of the fan blade, the curvature determines a relative exit angle at the trailing edge, based on an incident flow velocity at the leading edge and a rotational velocity of the airfoil at the relative span height;
wherein the relative air angle is defined according to angle $\beta_2$ or angle $\beta_2'$ as provided in Table 1 herein for relative span heights between 75% and 95%, within a tolerance of two degrees)(±2°).

17. The fan blade of claim 16, wherein the relative air angle is defined according to angle $\beta_2$ or angle $\beta_2'$ as provided in Table 1 herein for relative span heights between 25% and 95%, within a tolerance of one degree (±1°).

18. The fan blade of claim 16, wherein in operation of the fan blade the relative air angle determines a substantially flat exit pressure ratio profile for relative span heights from 75% to 95%, wherein the exit pressure ratio profile is substantially constant within a tolerance of 10% (±10%) of a maximum value of the exit pressure ratio profile.

19. The fan blade of claim 18, wherein the tolerance is 2% (±2%) of the maximum value of the exit pressure ratio profile.

20. The fan blade of claim 18, wherein the exit pressure ratio profile is non-decreasing for relative span heights from 50% to 95%.

21. A turbofan engine comprising the fan blade of claim 16.

22. A turbine engine comprising the fan blade of claim 16, wherein in operation of the turbine engine the relative air angle determines an exit pressure ratio that has an absolute value of at least 1.3 for each of the relative span heights from 75% to 95%.

23. The turbine engine of claim 22, wherein the exit pressure ratio has an absolute value of at least 1.4 at a relative span height of 97%.

* * * * *